Figure 1:
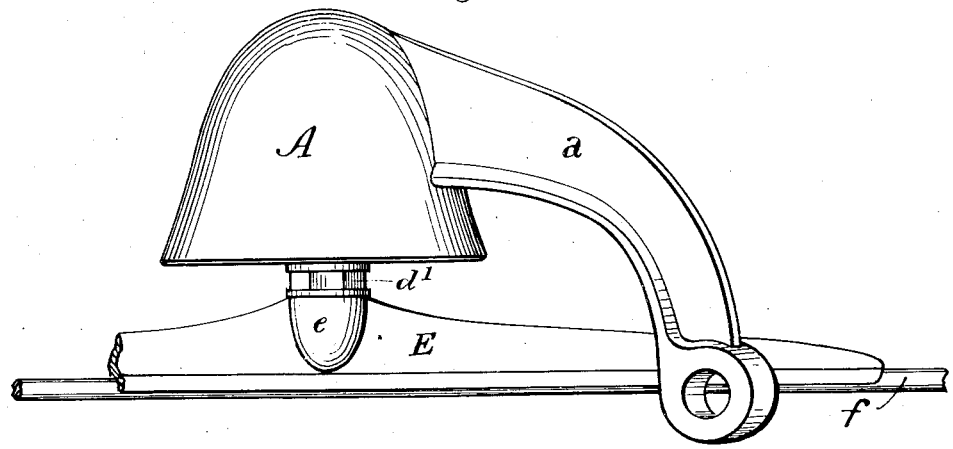

W. A. McCALLUM.
HANGER FOR TROLLEY WIRES.
APPLICATION FILED MAY 24, 1909.

955,185.

Patented Apr. 19, 1910.

WITNESSES:
Walter A. Knight.
A. L. Tildesley

INVENTOR.
William A. McCallum
BY
Lewis M. Hosea
ATTORNEY.

UNITED STATES PATENT OFFICE.

WILLIAM ANDREW McCALLUM, OF CINCINNATI, OHIO.

HANGER FOR TROLLEY-WIRES.

955,185.  Specification of Letters Patent.  Patented Apr. 19, 1910.

Application filed May 24, 1909. Serial No. 498,100.

*To all whom it may concern:*

Be it known that I, WILLIAM ANDREW McCALLUM, a citizen of the United States, residing at Cincinnati, in the county of Hamilton and State of Ohio, have invented new and useful Improvements in Hangers for Trolley-Wires, of which the following is a specification.

My invention relates to hangers used for suspending a trolley wire ear from a span wire, or other fixed support, in electric railway service; its object being to provide a simple inexpensive and efficient hanger to which trolley ears may be secured with ease and convenience at any radial angle therewith, while the trolley wire is attached to the ear and the hanger to its span wire or other support; and which may be as readily detached without disconnecting the other parts.

I have selected, for illustrating the nature of my improvement, a type of hanger in very general use, sometimes known as the " one-piece " hanger, consisting of an inverted cup-shaped shell, having embedded in compressed insulating material within the cup, a bolt projecting below threaded to engage the trolley ear,—all being parts of one unitary and rigid structure. The advantages of this type of hangers have caused them to be largely employed because of their insulating quality whereby " ball strains " and other insulating adjuncts are avoided; yet they are subject to a serious disadvantage by reason of the necessity of rotating either the hanger or the trolley ear in order to connect the two together. This necessity has practically barred their use heretofore in " pull-overs " on curves, because of interference with the down-projecting arms of the pull over hangers (illustrated in the drawings herewith and further referred to in this specification) which prevents such interrotation. This disadvantage mentioned exists in a lesser degree in straight line work, where the hangers are held upon span wires, because in order to interrotate the parts in putting together or taking apart, the ear must be detached from the trolley wire or the hanger from the span wire; which is sometimes difficult and expensive in time and labor.

A further general disadvantage of the former construction lies in this, namely: that in securing the trolley ear and hanger together by interrotation to seat the connecting bolt of one in the corresponding socket of the other, the radial relations of the hanger and the ear, when the suspending bolt is screwed home in the ear, may not, and generally do not, comport with those of the span wire or other support, and the trolley wire; so that it is necessary to turn back the ear upon its suspending bolt until it and the supported trolley wire are in proper radial relations. Thus it happens that the trolley wire is in fact generally maintained upon a loose connection of its suspending bolt with the ear, which for many reasons is undesirable. To connect the parts also frequently necessitates extra labor and expense in taking down the span wire from its supports or detaching the trolley wire from the ear, in order to detach the ear from the hanger, in making repairs, etc.

To obviate these and other evils, and produce a hanger applicable to all situations of use is the prime object of my invention; although while especially advantageous in the type of insulating hangers, it is not necessarily limited thereto.

To the ends above indicated, my invention consists in a hanger adapted to be secured to the trolley ear by rotation of a bolt or stem rotatable in both the hanger and the ear independently of either and without affecting their radial relations or their connection with other parts; and, conversely, detachable by reverse rotation of said bolt or stem without other disconnection of parts.

Figure 2:
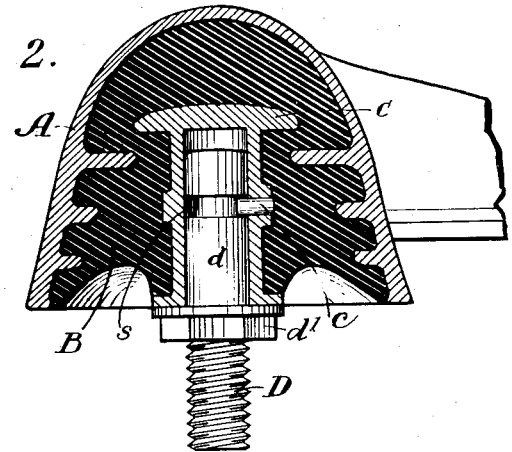
Figure 3:
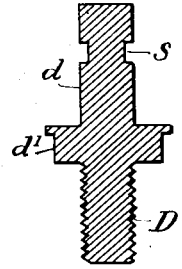
Figure 4:
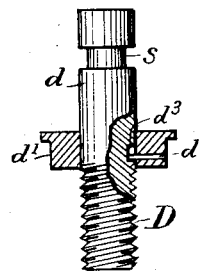
Figure 5:
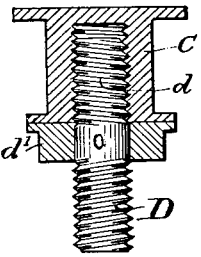
Figure 6:
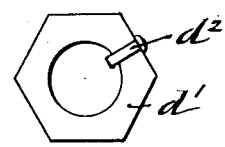

My invention is illustrated in the accompanying drawings, in which:

Figure 1, is an elevation in perspective of a " single-piece " hanger, embodying my improvement and constructed as a " pull-over ", fitted with a long trolley ear engaging by means of solder a round trolley wire. Fig. 2, is an axial cross section of the hanger showing the bolt and its containing socket in position. Figs. 3 and 4, are detail elevations of two forms of bolts or stems. Fig. 5, is a detail showing a variant form of bolt and socket; and Fig. 6, is a plan of the separable collar.

Referring now to the drawings, A designates a cup-shaped shell, known as the " cap ", which, in the type selected for illustration, is provided with a lateral arm, *a*, for connection by guy wire with a post or other support at the outside of a curve, to hold the trolley wire in a parallel curve with the track. The cap is formed with suitable inner corrugations or ledges to interlock with a filling material, B, in which, in constructions heretofore used, is rigidly embedded the shank and head of an ordinary threaded bolt projecting below the filling to engage the trolley ear E, to sustain the trolley wire, f. In my improvement, in lieu of such bolt, a short spool or socket-piece C, is embedded, adapted to contain in a rotative connection the shank d of a bolt or stem D, held against longitudinal displacement by a pin c projected radially through the shell of the socket-piece into a circumferential groove s of the shank d of the bolt or stem.

Immediately adjacent to the lower face of the socket-piece C, the bolt D is enlarged into a flange or head $d^1$, having plane faces, to which a wrench may be applied to rotate the bolt; and below this, the bolt is threaded to the end.

Fig. 2 shows the socket-piece C and the bolt D in position, and in Fig. 3 the bolt D is axially sectioned to exhibit its solid structure throughout.

In Fig. 4, I have shown the enlargement or head $d^1$ formed separate from the shank, d, as a collar connected rotatively with the stem by a pin, $d^2$, set radially in the collar and projecting into a slightly elongated vertical slot, $d^3$, in the side of the shank, d,—the object being to give the collar a slight vertical play upon the shank, in order that, when the bolt D is seated in the boss e of the trolley ear a slight additional turning of the bolt draws the ear E upward thereon, and the collar is compressed between the boss e and the spool C and secures a more rigid connection.

In Fig. 5, I have shown the upper part or shank d of the stem threaded like the lower end, but in the opposite direction, and provided with the self-adjusting rotating collar just above described. The socket piece is correspondingly threaded. The bolt D thus constructed is now an independent element, and seats by its rotation in the socket piece C and in the boss e at the same time, while the collar becomes the wedging element as before. This form of structure may on some accounts be preferred; but it is still within the principle of my invention, which contemplates a rotatable stem seated within and projecting beneath the hanger cap, allowing the hanger to be secured in any radial relations.

Fig. 1 shows the hanger attached to an early form of ear by screwing the bolt into the boss e, provided therefor. Such attachment would be impossible, as will be obvious, if to seat the bolt required the interrotation of either the cap structure A, or the trolley ear E, because of interference of the arm a.

In my improvement, however, the attachment is effected by rotation of the bolt D alone without rotation of the cap or the trolley ear, or detaching either from their other connections, and at any desired radial adjustment of the ear with the hanger.

In the constructions heretofore used, the "one-piece" or insulated cap-structure could not be applied to the single or double "pullovers" for the reason above explained; and it was necessary to insulate the hangers by separate insulators known as "ball strains" which were objectionable because in case the trolley wheel jumped from its wire, these insulators were frequently injured or destroyed. The use of these is eliminated, and their attendant disadvantages are avoided by my improvement.

In the use of the insulated cap hangers in straight track work where the hanger is supported by a span wire, my improvement greatly facilitates the work of original construction and repairs by making the attachment or detachment of the trolley ear and hanger independent of their other connections. Moreover, in any situation, it insures a more rigid junction of the parts with accuracy in radial relations.

I claim as my invention and desire to secure by Letters Patent of the United States:—

1. A suspending hanger for trolley wires, consisting of an integral shield or cap, adapted to be secured to a fixed support and having a socket opening from below, a limited distance into the body of the shield or cap, in combination with a screw threaded suspending bolt, secured rotatably in and projecting below said socket, and adapted to engage by its rotation a correspondingly threaded trolley ear.

2. A suspending hanger for trolley wires, consisting of an integral shield or cap, adapted to be secured to a fixed support and having a socket opening from below, a limited distance into the body of the shield or cap, in combination with a screw threaded suspending bolt, secured rotatably in and projecting below said socket, and adapted to engage by its rotation the correspondingly threaded trolley ear; and a collar seated upon the projecting end of the bolt with a limited longitudinal play, adjacent to the cap-body but engaging the bolt when rotated.

3. A suspending hanger for trolley wires, embodying an integral shield or cap adapted to be secured to a fixed support; a filling of insulating material within the hollow of the cap; a cylindrical metal socket-piece centrally embedded in and supported by the filling material and insulated thereby, and a screw threaded suspending bolt carried rotatively within said socket-piece wholly within the integral shield or cap and projecting below the same, to engage the trolley ear.

4. A suspending hanger for trolley wires, embodying a shield or cap to be secured to a fixed support; a filling of insulating material within the hollow of the cap; a socket-piece centrally embedded in and supported by the filling material; a screw-threaded bolt adapted to seat in said socket and in a trolley ear below; and a plane-faced collar carried at the zone of said bolt adjacent to the shield or cap; and a pin carried radially in said collar projecting inwardly into a longitudinally extended slot of the bolt, securing the collar thereto as a non-rotatable engaging element having a limited longitudinal play.

In testimony whereof I have hereunto set my hand in presence of two subscribing witnesses.

WILLIAM ANDREW McCALLUM.

Witnesses:
 WALTER A. KNIGHT,
 A. L. TILDESLEY.